(12) United States Patent
Cieslinski

(10) Patent No.: US 8,941,764 B2
(45) Date of Patent: Jan. 27, 2015

(54) IMAGE SENSOR

(75) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 375 days.

(21) Appl. No.: 13/294,419

(22) Filed: Nov. 11, 2011

(65) Prior Publication Data

US 2012/0119064 A1    May 17, 2012

(30) Foreign Application Priority Data

Nov. 15, 2010 (DE) .......................... 10 2010 051 440

(51) Int. Cl.
*H04N 3/14* (2006.01)
*H04N 5/335* (2011.01)
*H04N 5/374* (2011.01)
*H04N 5/365* (2011.01)
*H04N 5/378* (2011.01)

(52) U.S. Cl.
CPC ............. *H04N 5/374* (2013.01); *H04N 5/3653* (2013.01); *H04N 5/378* (2013.01)
USPC .......................... 348/302; 250/208.1; 257/231

(58) Field of Classification Search
USPC .......... 348/302, 308; 257/291, 231, 233, 292; 250/208.1
See application file for complete search history.

(56) References Cited

U.S. PATENT DOCUMENTS

| | | |
|---|---|---|
| 6,787,752 B2 | 9/2004 | Tsai |
| 6,911,641 B2 | 6/2005 | Tsai |
| 7,554,066 B2 | 6/2009 | Yan |
| 7,858,916 B2 | 12/2010 | Yan |
| 2005/0062866 A1 | 3/2005 | Ang |
| 2006/0050162 A1 | 3/2006 | Nakamura |
| 2007/0228256 A1 | 10/2007 | Mentzer et al. |
| 2008/0309809 A1 | 12/2008 | Cieslinski |
| 2009/0039956 A1 | 2/2009 | Mo |
| 2009/0146196 A1 | 6/2009 | Cieslinski |
| 2010/0283881 A1* | 11/2010 | Araki et al. ................... 348/308 |
| 2012/0062772 A1* | 3/2012 | Osawa et al. ................. 348/300 |

FOREIGN PATENT DOCUMENTS

DE    103 38 700 B4    6/2004
DE    696 34 833 T2    6/2005

(Continued)

OTHER PUBLICATIONS

German Search Report dated Jul. 12, 2007 relating to DE No. 10 2010 051 440.3.

*Primary Examiner* — Paul Berardesca
(74) *Attorney, Agent, or Firm* — Gifford, Krass, Sprinkle, Anderson & Citkowski, P.C.

(57) ABSTRACT

An image sensor for electronic cameras includes a plurality of light sensitive pixels arranged in rows and columns, wherein the pixels of a respective column can be read out via a respective column line and includes a plurality of data outputs, wherein a plurality of column lines are associated with the respective data output via at least one multiplexer device. The column lines are divided into a plurality of column line groups, wherein the respective column line group includes a plurality of column lines arranged next to one another; and wherein the number of column lines of the respective column line group corresponds to the number of the column lines associated with the respective data output.

29 Claims, 7 Drawing Sheets

(56) References Cited

FOREIGN PATENT DOCUMENTS

| | | |
|---|---|---|
| DE | 10 2007 027 463 A1 | 6/2007 |
| DE | 10 2007 045 448 A1 | 9/2007 |
| DE | 10 2007 058 973 A1 | 12/2007 |
| DE | 10 2009 004 187 A1 | 1/2010 |
| GB | 2 387 985 A | 10/2003 |
| WO | WO-99/16238 | 4/1999 |

\* cited by examiner

IMAGE SENSOR

CROSS-REFERENCE TO RELATED APPLICATIONS

This application claims priority of German Patent Application DE 10 2010 051 440.3 filed Nov. 15, 2010.

FIELD OF THE INVENTION

The present invention relates to an image sensor, in particular to a CMOS image sensor, for electronic cameras, having a plurality of light-sensitive pixels arranged in rows and columns, wherein the pixels of a respective column can be read out via a respective column line.

BACKGROUND OF THE INVENTION

In electronic cameras, the light-sensitive elements or pixels convert light incident through an objective of the camera into electric signals. Each of the pixels is addressed to read out an image, with each pixel corresponding to a respective picture element of the image. The pixels arranged in rows and columns form an image field of the image sensor. A signal which is proportional to a charge of the pixel collected by an exposure is conducted to an output of the image sensor.

Image sensors are in particular known which have a separate row selection line for each row and a separate column line for each column. The reading out of such an image sensor takes place row-wise, i.e. row for row. For this purpose, the pixels of the respective row are switched to the column lines by means of the respective row selection line. A separate column amplifier is usually associated with each of the column lines. The column amplifiers are provided for the purpose of amplifying the signals of the pixels of the selected row applied to the column lines. The amplified signals are conducted to the data output via a multiplexer device or, if a plurality of data outputs are provided, as is preferred to achieve a high picture rate, to the plurality of outputs of the image sensor.

A separate data output is also not usually provided for each column line and/or each column amplifier with a plurality of data outputs since a substantial space requirements and thus cost expense is associated with every data output. For example, 32 data outputs (per channel) can be provided for an image sensor having 4096×3112 pixels. The number of data outputs is as a rule therefore smaller than the number of column lines and/or column amplifiers, i.e. a plurality of column lines and/or column amplifiers are associated with the respective data output via at least one multiplexer device. This means that the signals transmitted by the plurality of column lines are read out via the respective "associated" data output.

Provision can be made to increase the dynamic range of the image sensor that the signals of the pixels are read out by two or more mutually separate channels which amplify the signals by different amounts. In such a case, the image sensor can include e.g. 2×32 data outputs, with then the same column lines and/or column amplifiers being associated with the respective data output of the second channel as with the associated data output of the first channel. The data outputs associated with the first channel and the data outputs associated with the second channel each in particular form a group of similar data outputs with the respective same amplification.

In the aforesaid example, 128 (4096:32) column lines and/or column amplifiers which are arranged next to one another and which form a respective column line group and/or column amplifier group are thus multiplexed to a respective data output. Generally, the number of column lines per column line group corresponds to the multiplex factor of the at least one multiplexer device of the image sensor, i.e. n column lines per column line group on an n-fold multiplexing.

As a rule, the individual data outputs cannot be manufactured completely identically with one another. The properties of the data outputs, in particular output amplifiers of the data outputs and/or analog/digital converters of the data outputs, rather differ slightly from one another. For example, an offset voltage or an amplification can be slightly different for different data outputs. The picture elements associated with the respectively differing data output then appear somewhat brighter or darker in comparison with the other picture elements.

A column line group is defined in connection with the present invention in that each column line group includes a plurality of column lines arranged next to one another and the number of column lines of the column line group corresponds (at least mathematically) to the number of column lines which are associated with a respective data output of the image sensor. In other words, the number of column line groups corresponds to the number of data outputs of the image sensor, with the column lines of each column line group being arranged next to one another. There is a problem with such a division of the column lines into column line groups when all column lines of a respective column line group are associated with the same data output (and only with it). Such a division admittedly has the advantage that no horizontal buses are required which ultimately connect the outputs of the column amplifiers to the data outputs and have to extend over the total width of the image sensor (high energy consumption, large space requirement, low speed). Instead, the data outputs are locally associated with the respective column line group and horizontal connections can be correspondingly short or can be omitted. However, with such a strict division, all picture elements associated with a column line group have a slightly different brightness in the case of a difference of the aforesaid kind, i.e. a larger region of contiguous picture elements or a whole picture field block has a slightly different brightness. A block-shaped brightness difference arises. A different brightness of one or more image field blocks from the brightness of the other image field blocks can be easily perceived by the eye and has a disturbing effect on the viewer. The image sensor explained in the aforesaid example with 32 data outputs (per channel) includes, for example, 32 image field blocks disposed next to one another.

SUMMARY OF THE INVENTION

It is the underlying object of the invention to provide an image sensor of the initially named kind which enables the occurring of block-shaped brightness difference to be suppressed.

This object is satisfied by an image sensor having the features of claim 1 and in particular in that a switch network arranged between the column lines and the data outputs is provided and is adapted to associate the column lines of the respective column line group to different data outputs, with a control device additionally being provided to control the switch network.

It is therefore possible in accordance with the invention to switch the column lines of each column line group arranged next to one another to a plurality of different data outputs. All picture elements of a contiguous image field block thus no longer have to be output at the same data output, in particular via the same output amplifier and/or the same analog/digital converter. With a corresponding control of the switch network by the control device, it can hereby ultimately be achieved that the differences in the image caused by a data output no longer relate to a total image field block, but rather to a plurality of image field blocks; however, only partly in each case. The interconnection of the column lines or column amplifiers with the data outputs required for this purpose and the required control can be realized simply since no transverse connections of any desired width are required between the column lines and the data outputs and the interconnection can be structured in accordance with a repeating pattern. The advantage is nevertheless maintained that no horizontal bus lines are required which extend over the total width of the image sensor.

Instead of a total image field block with a differing brightness, individual picture elements with differing brightness arise which can, however, be statistically or quasi-randomly distributed over a region of the image so that a kind of dot pattern is formed. A cross-block "scrambling" of an otherwise block-shaped difference is thus possible.

Since such a dot pattern is less perceivable to the human eye than a block-shaped difference—the recognizability of a dot pattern is approximately only a tenth of the recognizability of a block-shaped difference—the subjective image quality of the image sensor can be considerably improved.

The switch network is a network of switches. The switch network in particular includes a plurality of switches which can be controlled such that different possibilities can be realized to switch the inputs of the switch network to the outputs of the switch network. The number of inputs of the switch network usually corresponds to the number of outputs of the switch network. In the multiplexer device, in contrast, the number of inputs is larger than the number of outputs. The switch network and/or the multiplexer device in particular extend/extends beyond all column lines and/or column amplifiers.

A row of column amplifiers is usually provided between the column lines, on the one hand, and the switch network and the multiplexer device, on the other hand, with a separate column amplifier being able to be associated with each column line, i.e. the number of column amplifiers corresponds to the number of column lines. All the pixels of a row can hereby be read out of the image field simultaneously. It is, however, generally also possible that fewer column amplifiers are provided than columns or column lines so that a respective column amplifier is associated with a plurality of columns or column lines or that a respective common column amplifier is provided for a respective plurality of column lines.

Provision can furthermore be made that the number of column line groups corresponds to the number of data outputs associated with a channel, i.e. the number of data outputs is identical to a whole number multiple of the number of column lines (n≥1, corresponding to the number of channels).

Provision can generally also be made that the or a switch network is already provided before the column amplifiers or the association of the column lines in accordance with the invention to the data inputs is already carried out before the column amplifiers.

The column amplifiers associated with a respective column line group in particular form a respective column amplifier group. Provided that the column amplifier groups likewise each include a plurality of column amplifiers arranged next to one another, the above and the following statements on the column line groups or column lines apply—where transferable—in an analog manner to the column amplifier groups or column amplifiers, or vice versa.

A data line is to be understood as a line through which signals of the pixels are conducted to the data outputs. The column lines are data lines (so-called column buses or bit lines). The number of these data lines is reduced by the multiplex device by the multiplex factor of the multiplexer device, i.e. the number of the outgoing data lines is smaller than the number of ingoing data lines. In the switch network, the number of ingoing data lines and the number of outgoing lines is identical as a rule.

The control device is in particular adapted to control the switch network such that the association of the column lines of the respective column line group to the data outputs varies from one row to the next row or from row to row. The distribution of the pixels of a column line group over the plurality of data outputs is in this respect preferably realized or selected such that no regular pattern arises.

The respective column line of the respective column line group can have an association probability with the respective data output which corresponds to a relative frequency with which the respective column line, in particular with respect to the different lines of the image sensor, is associated with the respective data output. This association probability can, for example, be calculated once for each column line and can then be placed in a stored look-up table. It can be ensured on the basis of such a preset association probability that a possible block-shaped brightness disturbance or brightness difference is scrambled or smeared sufficiently effectively in a horizontal direction, in particular without perceptible block edges.

The association probability with at least two of the data outputs is preferably different. The frequency with which the respective column line of the respective column line group is connected to the respective associated data output is therefore not the same for all of the data outputs associated with the respective column line. Additionally or alternatively, the association probability is the smaller, the further the respective data output is remote from the respective column line group of the respective column line. A gentle transition of the interference or difference caused by a data output in the image can hereby be achieved and an abrupt drop in the brightness from one image field block in the image to the next image field block in the image can be avoided. For example, the association probability can have a Gaussian distribution for this purpose.

The control device is preferably adapted to control the switch network such that the association of the column lines of the respective column line group with the data outputs varies from one image to the next image or from image to image. It can hereby be achieved that the perceptibility of the difference of one or more data outputs from the other data outputs is particularly small.

In accordance with an embodiment of the invention, the or one of the plurality of multiplexer devices is arranged between the column lines and the switch network, i.e. before the switch network. The number of the ingoing data lines at the switch network, and thus the number of the inputs required for the switch network, is thus reduced so that the switch network can have a smaller complexity with respect to an embodiment having a higher number of inputs.

In accordance with another embodiment of the invention, the or one of the plurality of multiplexer devices is arranged between the switch network and the data outputs, i.e. after the switch network. The number of the data lines present after the switch network can hereby be reduced and thus the number of the required data outputs can be kept small.

The switch network can in particular be arranged between a first multiplexer device and a second multiplexer device in a combination of the two aforesaid arrangements, whereby the above-described advantages can be achieved. In other words, the image sensor in this embodiment includes a first multiplexer device and a second multiplexer device between the column lines and the data outputs, with the named switch network being interposed between the first multiplexer device and the second multiplexer device. A cross-block "scrambling" of an otherwise block-shaped brightness difference is hereby possible, with the switch network being able to have a low complexity and the number of the required data outputs being able to be kept small.

Furthermore, a further switch network can be provided which is arranged between the multiplexer device arranged after the aforesaid switch network and the data outputs. The scrambling range, i.e. the distance over which a respective data signal can be "shifted" in or against the row direction with respect to the respective underlying column line, can be increased by the further switch network since the further switch network is based on already twice-multiplexed data lines. The above and the following statements on the switch network apply—where transferable—in an analog manner to the further switch network.

The control device preferably includes a plurality of control lines and/or the respective switch network includes a plurality of rows, connected after one another, with switches, with a respective switch row being controllable by a respective control line. In this respect, it is not necessary that a switch is associated with each data line in a switch row, i.e. provision can also be made that no switches are associated with some of the data lines in a switch row.

The respective switch row can in particular include a plurality of intermediate switches, particularly a plurality of cross switches (also referred to as X-switches). It is then possible to change from a straight connection between two terminal pairs of two in particular parallel data lines to a crossover connection, i.e. the data signals applied to the data lines can be swapped with one another. Furthermore, crossover connections or crossover data lines can be provided between two mutually following switch rows. The aforesaid scrambling range can in particular hereby be increased.

The association of the column amplifiers with the data outputs can generally be dependent on a data word applied to control lines for the switch network. The word length in particular corresponds to the number of control lines in this respect.

The respective switch network preferably has a switching pattern repeating in the row direction to keep the complexity of the switch network as small as possible and to avoid periodic irregularities.

The invention furthermore relates to a method for the reading out of an image sensor, in particular of a CMOS image sensor, for electronic cameras, wherein the image sensor includes a plurality of light sensitive pixels arranged in rows and columns and a plurality of data outputs, wherein the pixels of a respective column are read out via a respective column line, wherein a plurality of column lines are associated with the respective data output via at least one respective multiplexer device, wherein the column lines are divided into a plurality of column line groups, wherein the respective column line group includes a plurality of column lines arranged next to one another, wherein the number of column lines of the respective column line group corresponds to the number of the column lines associated with the respective data output and wherein the column lines of the respective column line group are associated with different data outputs.

Preferred embodiments of the method in accordance with the invention result in an analog manner from the preferred embodiments of the image sensor in accordance with the invention.

BRIEF DESCRIPTION OF THE DRAWINGS

Non-restricting embodiments of the invention are shown in the drawing and will be described in the following.

There are shown, schematically in each case.

DETAILED DESCRIPTION OF THE PREFERRED EMBODIMENTS

Figure 1:
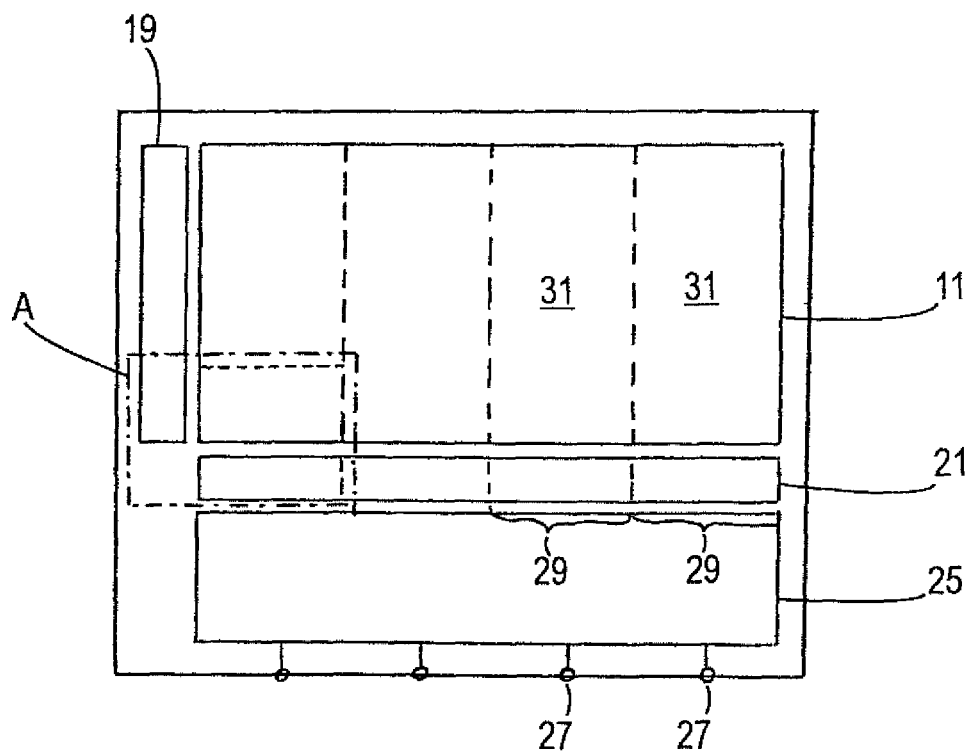
FIG. 1 an image sensor in accordance with the invention with a scrambling circuit.
Figure 2:
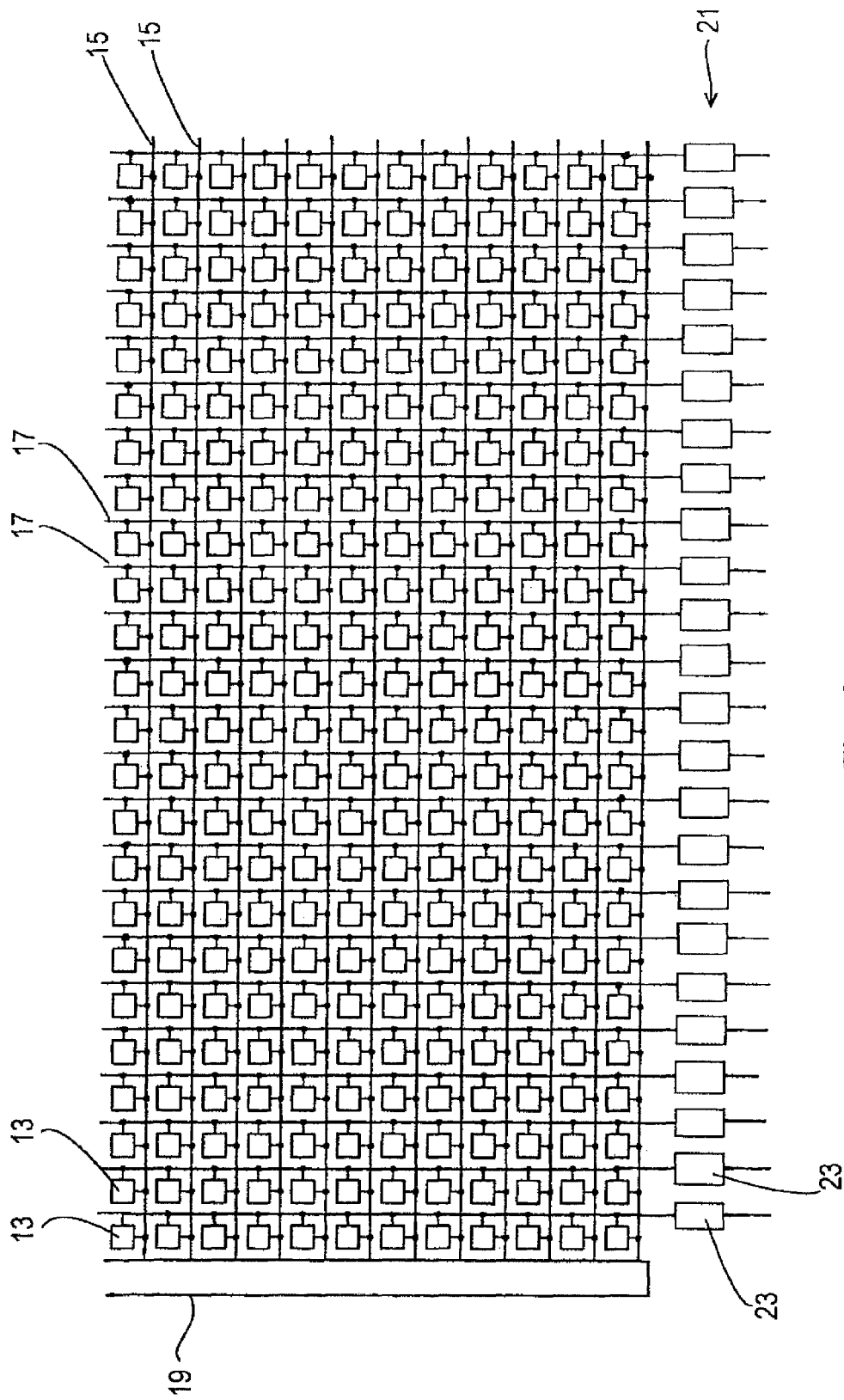
FIG. 2 the detail A from FIG. 1.

The single-channel image sensor shown in FIGS. 1 and 2 includes an image field 11 which is formed from a plurality of pixels 13 which are arranged along rows and columns. A separate row selection line 15 is provided for each row; a separate column line 17 for each column. The reading out of the image sensor takes place row-wise. For this purpose, the pixels 13 of the respective row are switched to the column lines 17 on the basis of control signals which are transmitted by means of the respective row selection line 15. A row addressing logic 19 is provided for addressing the row selection line 15 associated with the respective row to be read out. Differing from the simplified representation in accordance with FIG. 2, a plurality of column lines 17 can also be provided for each column, with each column line 17 of a column only being able to be associated with some of the pixels 13 of this column.

A row 21 of column amplifiers 23 is provided beneath the image field 11. The row 21 runs parallel to the lines of the image field 11. A separate column amplifier 23 is associated with each column line 17. The column amplifiers 23 serve the purpose of amplifying the signals of the pixels 13 of the selected row applied to the column lines 17. For this purpose, a sample and hold circuit, not shown, is connected before the respective column amplifier 23 and holds the output signal of the respective pixel 13 to a constant value. The column amplifiers 23 are preferably difference amplifiers and a correlated double sampling takes place in operation, i.e. a reference signal is additionally read out beside the actual signal to suppress the thermal noise of the image sensor. The signals of the pixels 13 amplified by the column amplifiers 23 are then conducted over a scrambling circuit 25 to a plurality of data outputs 27.

The column lines 17 can be seen as divided into a plurality of column line groups 31 due to their spatial arrangement, with each column line group 31 including a plurality of column lines 17 arranged next to one another so that a plurality of column line groups 31 arranged next to one anther are present in the image field 11. The column line groups 31 can also be called image field blocks. The number of column line groups 31 corresponds to the number of data outputs 27, i.e.

the number of column lines 17 per column line group 31 results from the number of all columns or column lines 17 and from the number of data outputs 27. The number of column lines 17 per column line group 31 furthermore corresponds to the number of column lines 17 associated with a respective data output 27. Furthermore, the column amplifiers 23 are also divided into a plurality of column amplifier groups 29 which correspond to the column line groups 31 and which each include a plurality of column amplifiers 23 arranged next to one another.

In image sensors known from the prior art, precisely one separate data output 27 is provided for each column line group 31 or column amplifier group 29, i.e. all column lines 17 of a column line group 31 are associated with the same data output 27, and indeed only with this one. In known image sensors, the named division of the column lines 17 into column groups 31 therefore not only results purely mathematically, but also directly from the coupling to a respective single data output 27. A data output 27 as a rule includes an output amplifier and/or an analog/digital converter to amplify and/or digitize the respective data signal before it leaves the image sensor or image sensor chip to external. It can now, however, occur due to process deviations in the manufacture of the image sensors that the electrical properties of at least one data output 27 differ from the electrical properties of the other data outputs 27, i.e. the data signals are amplified differently by the at least one data output 27 than also by the other data outputs 27 so that the at least one other data output 27 generates a different brightness than the other data outputs 27 with the same input signal. Since a delineated column line group 31 or a delineated image field block is associated with the at least one other data output 27, this image field block 31 has a brightness differing from the brightness of the other image field blocks 31. Such a block-shaped difference is perceived by the eye and is disturbing for the viewer.

Figure 3A:
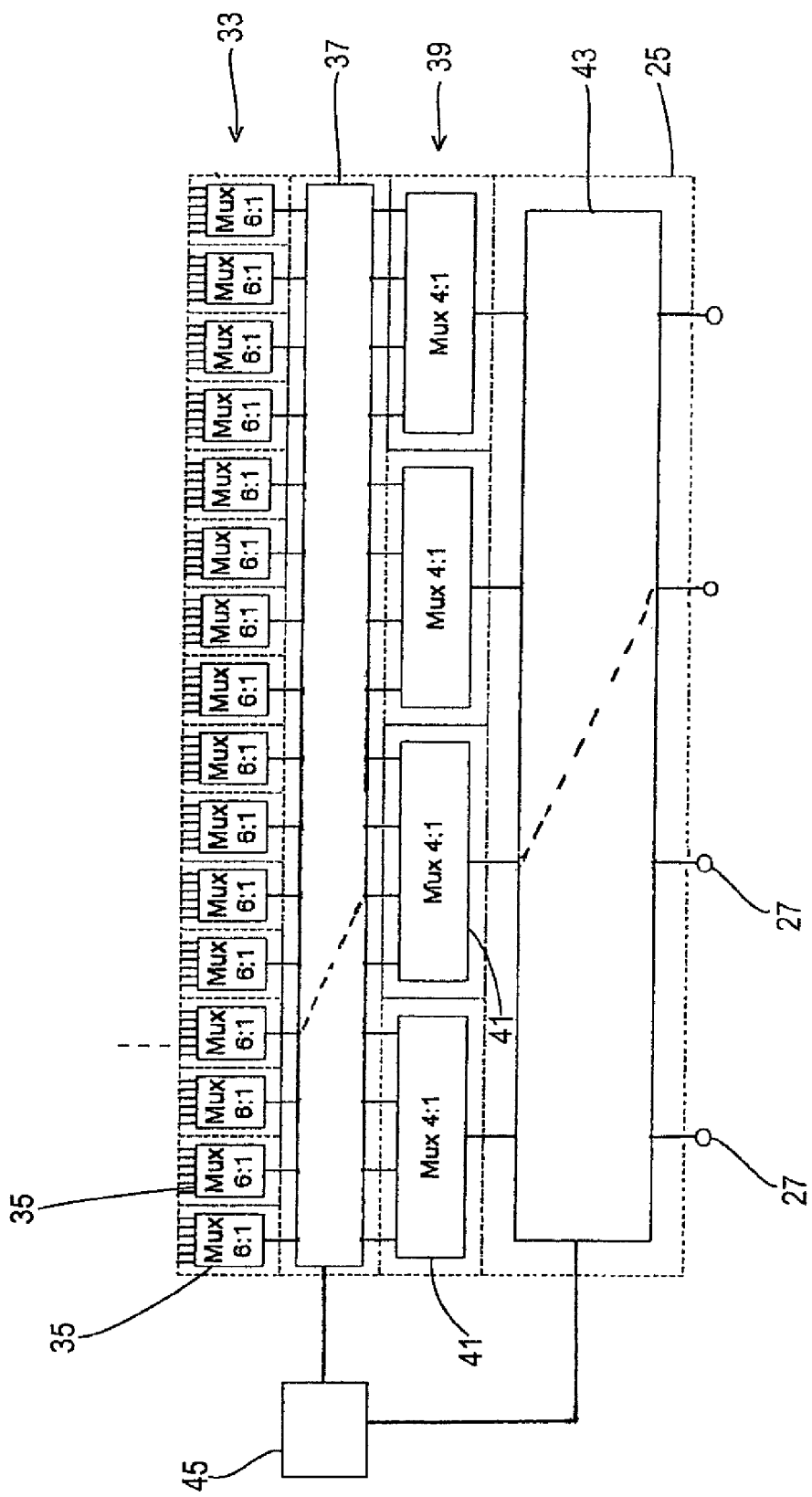
FIGS. 3a and 3b the scrambling circuit of FIG. 1 with two rows of multiplexers and two switch networks or one single switch network.
Figure 3B:
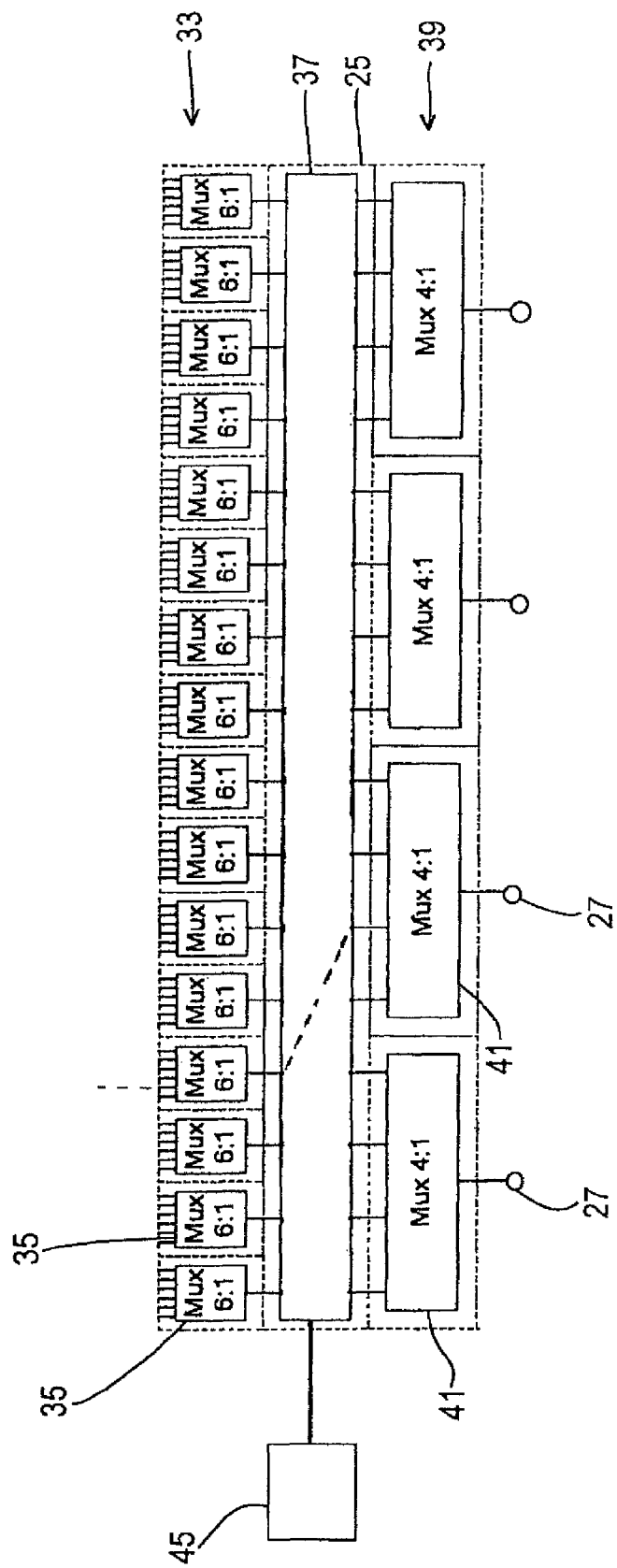
Figure 6:
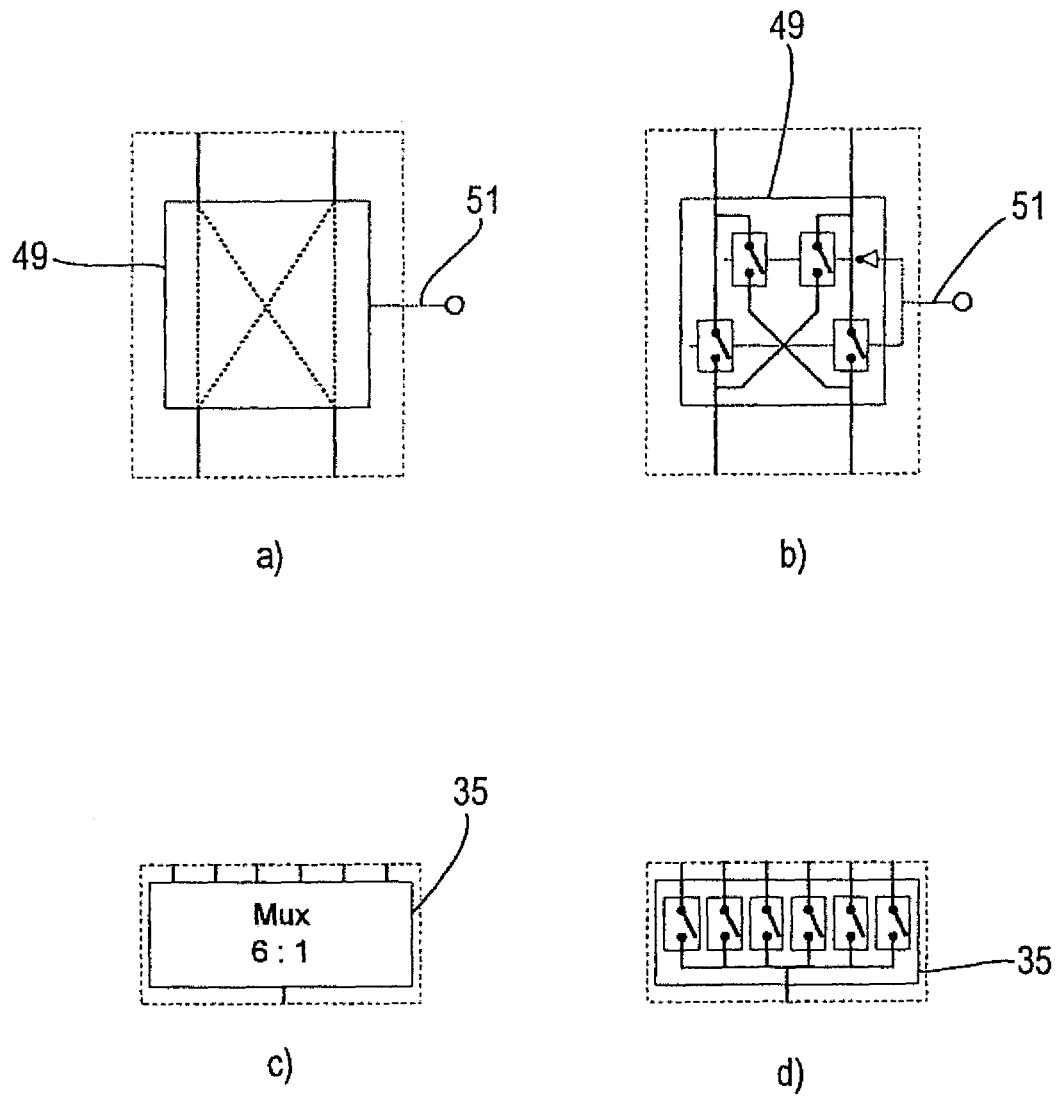
FIG. 6 an embodiment of an intermediate switch in accordance with FIGS. 4 and 5 and an embodiment of a multiplexer in accordance with FIGS. 3a and 3b.

The image sensor in accordance with the invention therefore has a scrambling circuit 25 such as is shown by way of example in FIGS. 3a and 3b and which adjoins the row 21 of column amplifiers 23. The scrambling circuit 25 includes at the input side a first row 33 of multiplexers 35 downstream of which a first switch network 37 is arranged. The number of data lines which corresponds to the number of column amplifiers 23 or to the number of column lines 17 in front of the first row 33 of multiplexers 35 can be reduced by the first row 33 of multiplexers 35 (by the factor 6:1 in the example shown here). The complexity of the downstream first switch network 37 is hereby kept small. An exemplary realization of a multiplexer 35 having corresponding switches is illustrated in FIGS. 6c and 6d.

It is made possible by the first switch network 37 which will be described in more detail at another passage to connect the column lines 17 of a column line group 31 to different data outputs 27 or to associate column lines 17 from different column line groups 31 with a respective data output 27. The pixels 13 of a column line group or of an image field block 31 are therefore not all output at the same data output 27, but can rather be output at different data outputs 27. A scrambling therefore takes place between the image field blocks 31 and the data outputs 27. The arising of a block-shaped brightness difference in the image can hereby be avoided since now the pixels 13 of an image field block 31 are output by different data outputs 27.

A control device 45 is provided to control the first switch network 37. The control device 45 controls the first switch network 37 such that the association of the column lines 17 with the data outputs 27 varies from one row to the next row so that the brighter or darker picture elements generated by a differing data output 27 do not correspond to a contiguous block in the image, but are rather distributed over the total image field 11. Instead of a block-shaped difference, a dot pattern therefore arises which is not perceptible or is hardly perceptible by the human eye in comparison with a "block", which circumstance can thereby be further amplified if the dot pattern varies from image to image.

The scrambling circuit 25 furthermore includes a second row 39 of multiplexers 41 which is arranged after the first switch network 37 and is arranged before the data outputs 27. The number of data lines, and thus the number of required data outputs 27, can be further reduced (here, for example, 4:1) by the second row 39 of multiplexers 41.

Optionally, a second switch network 43 can be arranged between the second row 39 of multiplexers 41 and the data outputs 27 and can generally be structured and controlled analog to the first switch network 37 (FIG. 3a). A scrambling range higher with respect to the first switch network 37 can be achieved by the second switch network 43 since twice multiplexed data lines or data signals form the basis of the second switch network 43.

A second switch network 43 is, however, not absolutely necessary, since a high scrambling range is already achieved by the first switch network 37. The embodiment shown in FIG. 3b with a single switch network 37 has a particularly simple structure, with the switch network 35 only requiring a small number of inputs in front of the switch network 37 due to the first row 33 of multiplexers 35, and with the number of required data outputs 27 after the switch network 37 being kept low due to the second row 39 of multiplexers 42.

As is indicated by chain dotting in FIGS. 3a and 3b, a data signal which belongs to a pixel 13 from the 20th column (from the left) of the image field 11 and would, for example, be output with an image sensor designed in accordance with the prior art via the first multiplexer 41 and by the first (i.e. left) data output 27, can, for example, be output in accordance with the invention by the two switch networks 37, 43 via the second multiplexer 41 and the third data output 27 (FIG. 3a) or by the switch network 37 via the second multiplexer 41 and the second data output 27 (FIG. 3b).

Figure 4:
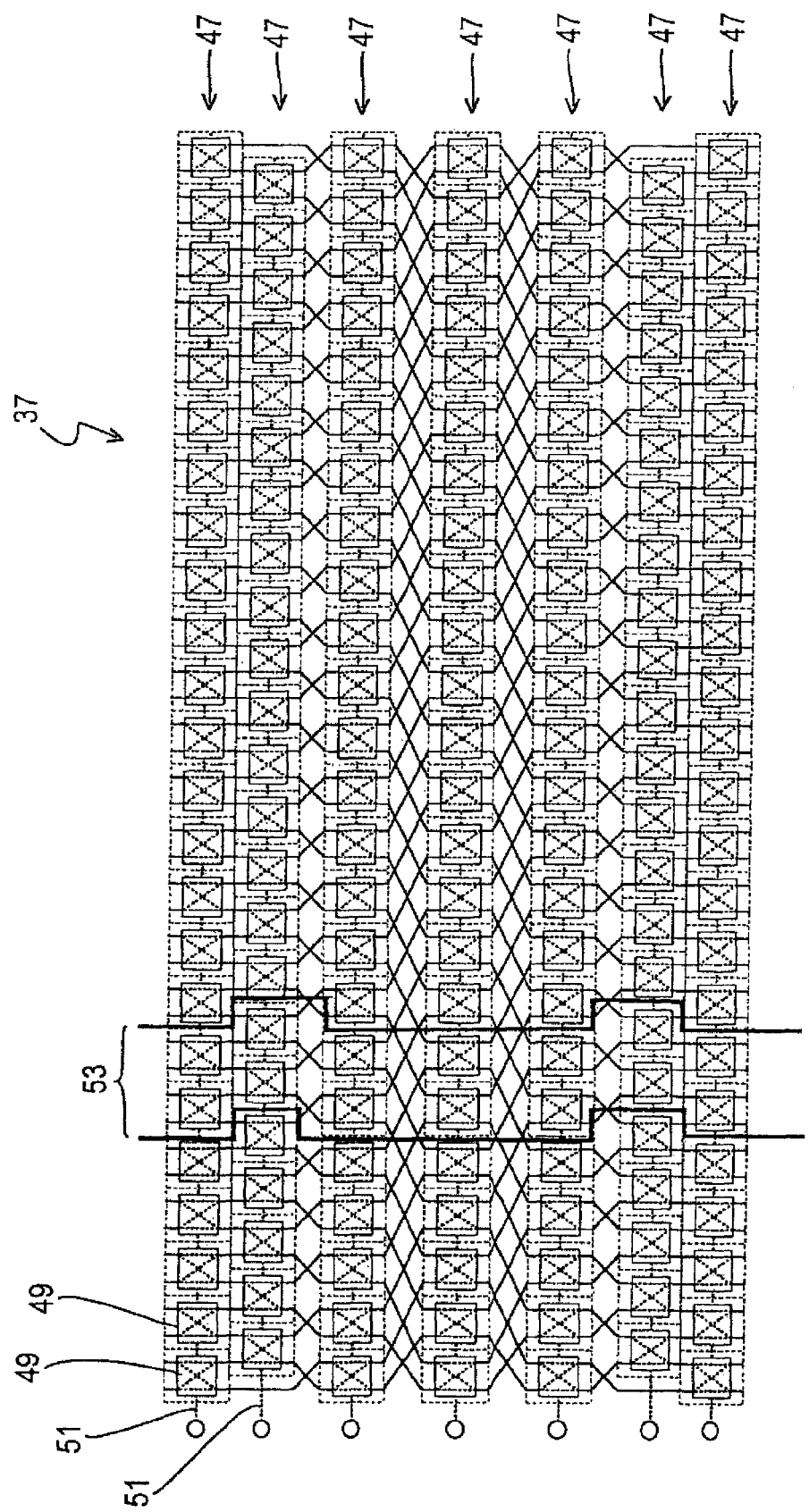
FIG. 4 a first embodiment of a switch network of FIGS. 3a and 3b with intermediate switches.

An exemplary embodiment of the first switch network 37 is shown in FIG. 4. The first switch network 37 includes a plurality of mutually following switch rows 47, with each switch row 47 including a plurality of intermediate switches 49. The intermediate switches 49 of a switch row 47 are controlled by a respective control line 51. A data word is applied to the control lines 51 for this purpose. The data signals applied to two parallel data lines can be conducted onward unchanged in parallel or can be swapped over in crossover fashion by an intermediate switch 49. An exemplary realization of an intermediate switch 49 is illustrated in FIGS. 6a and 6b. The data lines can extend parallel to one another and/or cross over between two switch rows 47. It can be achieved by an intermediate switch 49 or by crossover data lines to shift a data signal along the row direction, with the shift or the distance over which a shift is made being able to be influenced by the position of the intermediate switches 49. As can be recognized from FIG. 4, the first switch network 37 in this respect has a circuit pattern 53 which repeats in the row direction, whereby the complexity of the first switch network 37 can be simplified.

Figure 5:
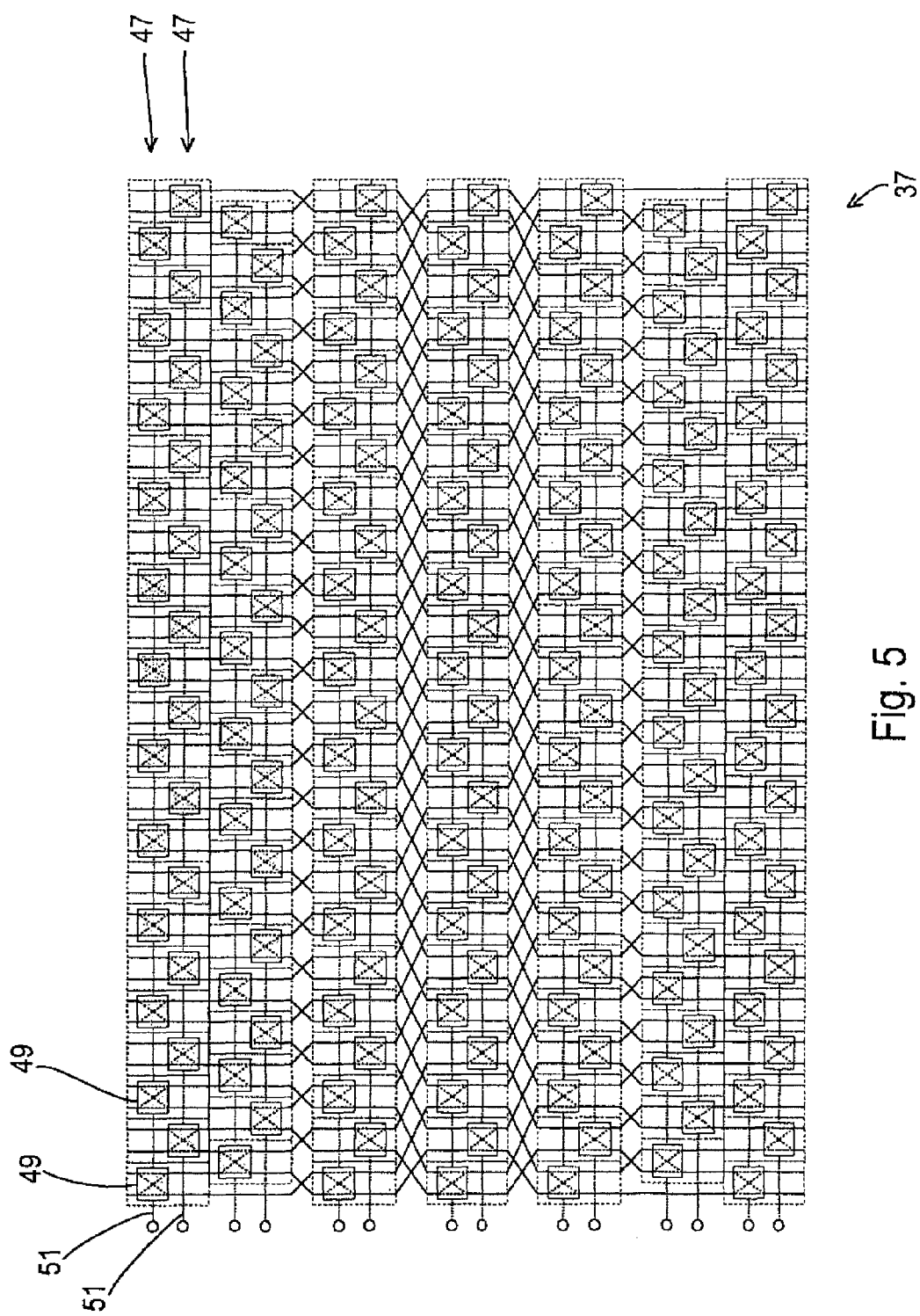
FIG. 5 a second embodiment of a switch network of FIGS. 3a and 3b with intermediate switches.

FIG. 5 shows a further embodiment of the first switch network 37 with switch rows 47, intermediate switches 49, control lines 51 and circuit patterns. The second switch network 43 is generally imaged in a corresponding manner as the first switch network 37, i.e. with switch rows 47, intermediate switches 49, control lines 51 and circuit patterns.

The multiplexers 35 of the first row 33 are formed as 6:1 multiplexers in FIGS. 3a and 3b and a total of 16 multiplexers 35 is provided. The image field 11 shown in FIG. 1 therefore has 96 pixels 13 per row. The multiplexers 41 of the second row 39 are made as 4:1 multiplexers so that a 24-fold multiplexing takes place overall. The size of the aforesaid image field 11 and the named multiplex factors are, however, only exemplary. Image sensors designed in accordance with the prior art can include an image field e.g. of 4096×3112 pixels. Furthermore, a multiplexer can generally be designed as an n-fold multiplexer, with n also being able to be not equal to 4 or 6. Furthermore, only one row of multiplexers or one switch network can also be provided or further rows of multiplexers or further switch networks can be provided.

The image quality of an image sensor perceived by the eye can be considerably increased by the present invention.

The invention claimed is:

1. An image sensor for electronic cameras, comprising
a plurality of light sensitive pixels arranged in rows and columns, wherein the pixels of a respective column can be read out via at least one respective column line; and
a plurality of data outputs, wherein a plurality of column lines are associated with a respective data output via at least one multiplexer device;
wherein the column lines are divided into a plurality of column line groups, wherein each column line group includes a plurality of column lines arranged next to one another; and wherein the number of column lines of the respective column line group corresponds to the number of the column lines associated with the respective data output;
wherein at least one switch network is provided between the column lines and the data outputs, the at least one switch network being adapted to associate the column lines of the respective column line group with different data outputs, with a control device being provided for controlling the switch network; and
wherein said at least one multiplexer device has a plurality of inputs and outputs and wherein the number of inputs is larger than the number of outputs.

2. The image sensor of claim 1,
wherein the control device is adapted to control the switch network such that the association of the column lines of the respective column line group to the data outputs varies from one row to the next row.

3. The image sensor of claim 1,
wherein each column line of the respective column line group has an association probability with a respective data output which corresponds to a relative frequency at which the respective column line is associated with said respective data output.

4. The image sensor of claim 3,
wherein the association probability of a respective column line with a respective data output is different from the association probability of said respective column line with a different data output.

5. The image sensor of claim 3,
wherein the association probability is smaller, the further the respective data output is remote from the respective column line group of the respective column line.

6. The image sensor of claim 5,
wherein the association probability corresponds to a Gaussian distribution.

7. The image sensor of claim 1,
wherein the control device is adapted to control the switch network such that the association of the column lines of the respective column line group with the data outputs varies from one image to the next image.

8. The image sensor of claim 1,
wherein the at least one multiplexer device is arranged between the plurality of column lines and the at least one switch network.

9. The image sensor of claim 1,
wherein the at least one multiplexer device is arranged between the at least one switch network and the plurality of data outputs.

10. The image sensor of claim 1,
wherein the at least one multiplexer device comprises a first multiplexer device and a second multiplexer device;
wherein the at least one switch network is arranged between the first multiplexer device and the second multiplexer device.

11. The image sensor of claim 1,
wherein the at least one switch network comprises a single switch network; and
wherein the at least one multiplexer device comprises a first multiplexer device arranged between the column lines and the single switch network and a second multiplexer device arranged between the single switch network and the plurality of data outputs.

12. The image sensor of claim 1,
wherein the at least one switch network comprises a first switch network and a second switch network;
wherein the at least one multiplexer device comprises a first multiplexer device arranged between the column lines and the first switch network and a second multiplexer device arranged between the first switch network and the second switch network; and
wherein the second switch network is arranged between the second multiplexer device and the plurality of data outputs.

13. The image sensor of claim 1,
wherein the control device includes a plurality of control lines;
wherein the at least one switch network includes a plurality of switch rows, the switch rows being connected after one another, each switch row comprising a plurality of switches; and
wherein the control device is adapted to control each switch row via a respective one of the plurality of control lines.

14. The image sensor of claim 13,
wherein the switches of each switch row include a plurality of intermediate switches; and
wherein the at least one switch network comprises a plurality of crossover connections arranged between two sequential switch rows.

15. The image sensor of claim 1,
wherein the control device is adapted to vary the association of the column lines with the data outputs depending on a data word applied to control lines connected to the at least one switch network.

16. The image sensor of claim 1,
wherein the at least one switch network has a design pattern repeating in the row direction.

17. An image sensor, comprising:
a plurality of light-sensitive pixels arranged in rows and columns;
a plurality of column lines;
a plurality of data outputs;
at least one multiplexer device; and at least one switch network, the at least one multiplexer device and the at least one switch network being arranged between the column lines and the data outputs; and a control device;

wherein the plurality of column lines form a plurality of column line groups, each column line group comprising a plurality of adjacent column lines, each column line belonging only to one of the plurality of column line groups, and the number of column line groups corresponding to the number of data outputs such that each column line group is associated with one of the data outputs;

wherein the control device is adapted to control the at least one switch network such that the at least one switch network connects the column lines of each column line group not only to the associated data output, but also to at least one further data output associated with another column line group; and wherein said at least one multiplexer device has a plurality of inputs and outputs and wherein the number of inputs is larger than the number of outputs.

18. The image sensor of claim 17, wherein the at least one switch network comprises a single switch network; and wherein the at least one multiplexer device comprises a first multiplexer device arranged between the column lines and the single switch network and a second multiplexer device arranged between the single switch network and the plurality of data outputs.

19. A method of reading out an image sensor for electronic cameras, wherein the image sensor includes a plurality of light sensitive pixels arranged in rows and columns and a plurality of data outputs, wherein the pixels of a respective column are read out via at least one respective column line, wherein a plurality of column lines are associated with a respective data output via at least one respective multiplexer device, wherein the column lines are divided into a plurality of column line groups, wherein the respective column line group includes a plurality of column lines arranged next to one another, wherein the number of column lines of the respective column line group corresponds to the number of the column lines associated with the respective data output, and wherein the column lines of the respective column line group are associated with different data outputs; and wherein said at least one multiplexer device has a plurality of inputs and outputs and wherein the number of inputs is larger than the number of outputs.

20. A method in accordance with claim 19, wherein the column lines of the respective column line group are associated with the different data outputs via at least one first multiplexer device, a following switch network and a following second multiplexer device.

21. An image sensor for electronic cameras, comprising a plurality of light sensitive pixels arranged in rows and columns, wherein the pixels of a respective column can be read out via at least one respective column line; and a plurality of data outputs, wherein a plurality of column lines are associated with a respective data output via at least one multiplexer device;

wherein the column lines are divided into a plurality of column line groups, wherein each column line group includes a plurality of column lines arranged next to one another; and wherein the number of column lines of the respective column line group corresponds to the number of the column lines associated with the respective data output;

wherein at least one switch network is provided between the column lines and the data outputs, the at least one switch network being adapted to associate the column lines of the respective column line group with different data outputs, with a control device being provided for controlling the switch network;

wherein each column line of the respective column line group has an association probability with a respective data output which corresponds to a relative frequency at which the respective column line is associated with said respective data output; and wherein the association probability is smaller, the further the respective data output is remote from the respective column line group of the respective column line.

22. An image sensor for electronic cameras, comprising a plurality of light sensitive pixels arranged in rows and columns, wherein the pixels of a respective column can be read out via at least one respective column line; and a plurality of data outputs, wherein a plurality of column lines are associated with a respective data output via at least one multiplexer device;

wherein the column lines are divided into a plurality of column line groups, wherein each column line group includes a plurality of column lines arranged next to one another; and wherein the number of column lines of the respective column line group corresponds to the number of the column lines associated with the respective data output;

wherein at least one switch network is provided between the column lines and the data outputs, the at least one switch network being adapted to associate the column lines of the respective column line group with different data outputs, with a control device being provided for controlling the switch network;

wherein the at least one switch network comprises a single switch network; and wherein the at least one multiplexer device comprises a first multiplexer device arranged between the column lines and the single switch network and a second multiplexer device arranged between the single switch network and the plurality of data outputs.

23. An image sensor for electronic cameras, comprising a plurality of light sensitive pixels arranged in rows and columns, wherein the pixels of a respective column can be read out via at least one respective column line; and a plurality of data outputs, wherein a plurality of column lines are associated with a respective data output via at least one multiplexer device;

wherein the column lines are divided into a plurality of column line groups, wherein each column line group includes a plurality of column lines arranged next to one another; and wherein the number of column lines of the respective column line group corresponds to the number of the column lines associated with the respective data output;

wherein at least one switch network is provided between the column lines and the data outputs, the at least one switch network being adapted to associate the column lines of the respective column line group with different data outputs, with a control device being provided for controlling the switch network;

wherein the at least one switch network comprises a first switch network and a second switch network;

wherein the at least one multiplexer device comprises a first multiplexer device arranged between the column lines and the first switch network and a second multiplexer device arranged between the first switch network and the second switch network; and wherein the second switch network is arranged between the second multiplexer device and the plurality of data outputs.

24. An image sensor for electronic cameras, comprising
a plurality of light sensitive pixels arranged in rows and columns, wherein the pixels of a respective column can be read out via at least one respective column line; and
a plurality of data outputs, wherein a plurality of column lines are associated with a respective data output via at least one multiplexer device;
wherein the column lines are divided into a plurality of column line groups, wherein each column line group includes a plurality of column lines arranged next to one another; and wherein the number of column lines of the respective column line group corresponds to the number of the column lines associated with the respective data output;
wherein at least one switch network is provided between the column lines and the data outputs, the at least one switch network being adapted to associate the column lines of the respective column line group with different data outputs, with a control device being provided for controlling the switch network;
wherein the control device includes a plurality of control lines;
wherein the at least one switch network includes a plurality of switch rows, the switch rows being connected after one another, each switch row comprising a plurality of switches;
wherein the control device is adapted to control each switch row via a respective one of the plurality of control lines;
wherein the switches of each switch row include a plurality of intermediate switches; and
wherein the at least one switch network comprises a plurality of crossover connections arranged between two sequential switch rows.

25. An image sensor, comprising:
a plurality of light-sensitive pixels arranged in rows and columns;
a plurality of column lines;
a plurality of data outputs;
at least one multiplexer device; and
at least one switch network, the at least one multiplexer device and the at least one switch network being arranged between the column lines and the data outputs; and
a control device;
wherein the plurality of column lines form a plurality of column line groups, each column line group comprising a plurality of adjacent column lines, each column line belonging only to one of the plurality of column line groups, and the number of column line groups corresponding to the number of data outputs such that each column line group is associated with one of the data outputs;
wherein the control device is adapted to control the at least one switch network such that the at least one switch network connects the column lines of each column line group not only to the associated data output, but also to at least one further data output associated with another column line group;
wherein the at least one switch network comprises a single switch network; and
wherein the at least one multiplexer device comprises a first multiplexer device arranged between the column lines and the single switch network and a second multiplexer device arranged between the single switch network and the plurality of data outputs.

26. A method of reading out an image sensor for electronic cameras, wherein the image sensor includes a plurality of light sensitive pixels arranged in rows and columns and a plurality of data outputs, wherein the pixels of a respective column are read out via at least one respective column line, wherein a plurality of column lines are associated with a respective data output via at least one respective multiplexer device, wherein the column lines are divided into a plurality of column line groups, wherein the respective column line group includes a plurality of column lines arranged next to one another, wherein the number of column lines of the respective column line group corresponds to the number of the column lines associated with the respective data output, and
wherein the column lines of the respective column line group are associated with different data outputs; and
wherein the column lines of the respective column line group are associated with the different data outputs via at least one first multiplexer device, a following switch network and a following second multiplexer device.

27. The method as defined in claim 1,
wherein the number of outputs for said at least one multiplexer device is smaller than the number of column lines.

28. The method as defined in claim 17,
wherein the number of outputs for said at least one multiplexer device is smaller than the number of column lines.

29. The method as defined in claim 19,
wherein the number of outputs for said at least one multiplexer device is smaller than the number of column lines.

* * * * *